United States Patent
Mobin et al.

(10) Patent No.: US 7,606,302 B2
(45) Date of Patent: Oct. 20, 2009

(54) METHOD AND APPARATUS FOR NON-LINEAR DECISION-FEEDBACK EQUALIZATION IN THE PRESENCE OF ASYMMETRIC CHANNEL

(75) Inventors: Mohammad S. Mobin, Orefield, PA (US); Gregory W. Sheets, Breingsville, PA (US); Lane A. Smith, Easton, PA (US); Paul H. Tracy, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 571 days.

(21) Appl. No.: 11/541,379

(22) Filed: Sep. 29, 2006

(65) Prior Publication Data

US 2008/0080609 A1 Apr. 3, 2008

(51) Int. Cl.
*H03H 7/30* (2006.01)
*H03H 7/40* (2006.01)
*H03K 5/159* (2006.01)

(52) U.S. Cl. .................. 375/233; 375/229; 375/232
(58) Field of Classification Search .......... 375/229–236
See application file for complete search history.

(56) References Cited

U.S. PATENT DOCUMENTS 7,397,848 B2 * 7/2008 Stojanovic et al. .......... 375/229
2002/0060820 A1 5/2002 Buchali
2002/0085656 A1 7/2002 Lee et al.
2004/0258145 A1 12/2004 Popescu et al.
2005/0002475 A1 * 1/2005 Menolfi et al. .............. 375/340
2005/0019042 A1 1/2005 Kaneda et al.
2005/0025228 A1 * 2/2005 Stonick et al. .............. 375/232
2007/0253477 A1 1/2007 Abel et al.

FOREIGN PATENT DOCUMENTS

EP 1 750 380 A 2/2007

* cited by examiner

*Primary Examiner*—Curtis B Odom
(74) *Attorney, Agent, or Firm*—Ryan, Mason & Lewis, LLP

(57) ABSTRACT

Methods and apparatus are provided for determining the threshold position of one or more latches employed for decision-feedback equalization in the presence of a non-linear channel. A latch employed by a decision-feedback equalizer is positioned by constraining input data such that the input data only contains transitions from a first binary value; obtaining a plurality of samples of a single-sided data eye associated with the constrained input data; determining a threshold position of the latch based on the samples; and transforming the determined position to address the non-linearity of the channel. For example, a non-linear mapping table can map measured threshold values to transformed threshold values based on distance.

20 Claims, 10 Drawing Sheets

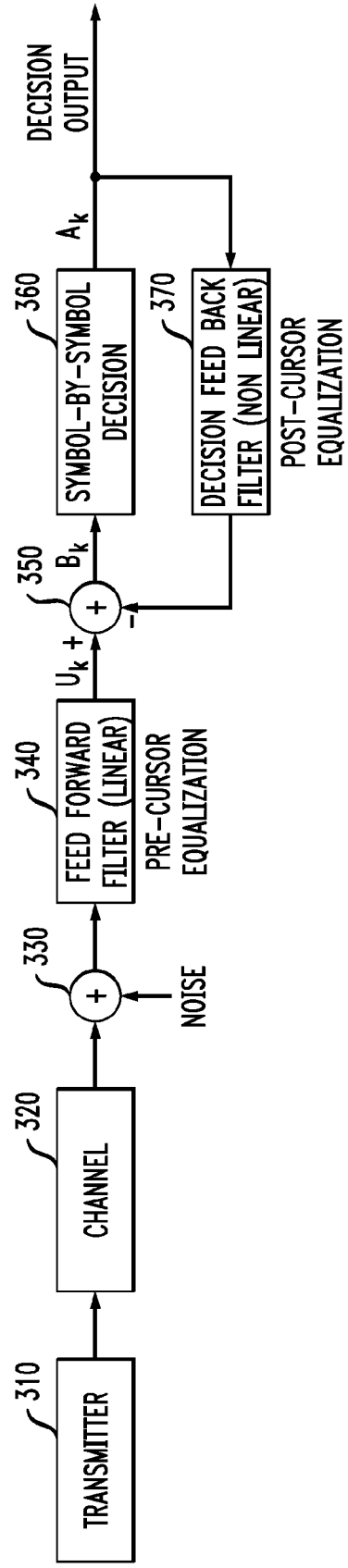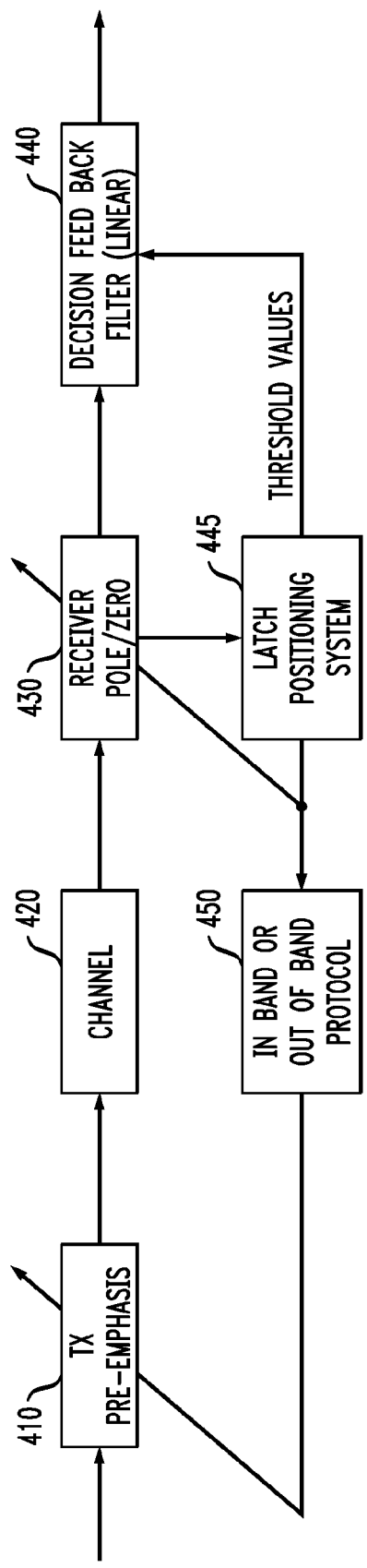

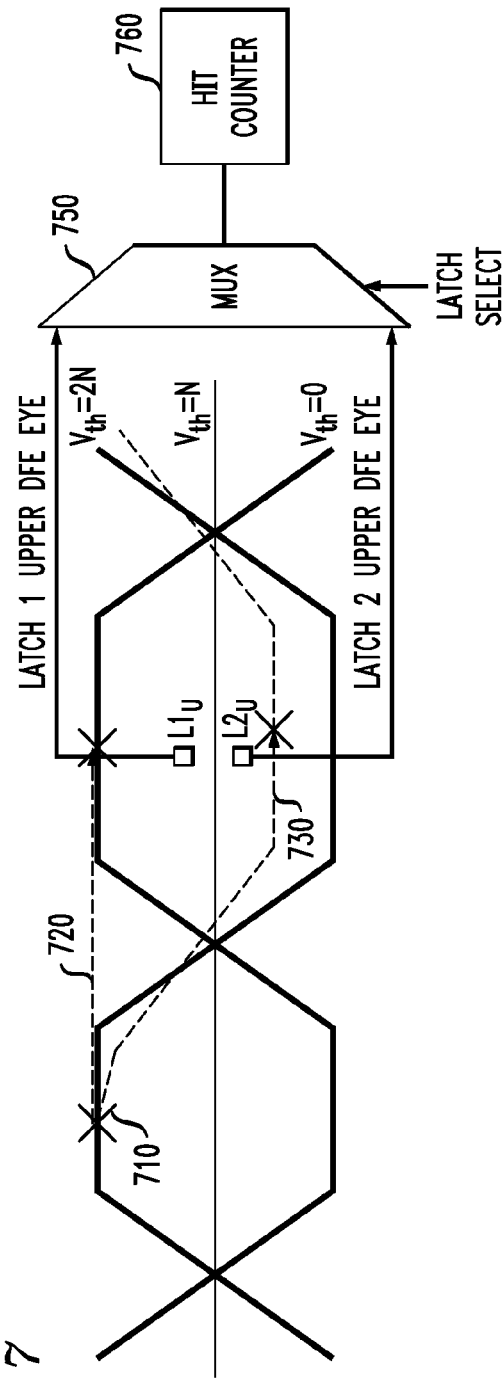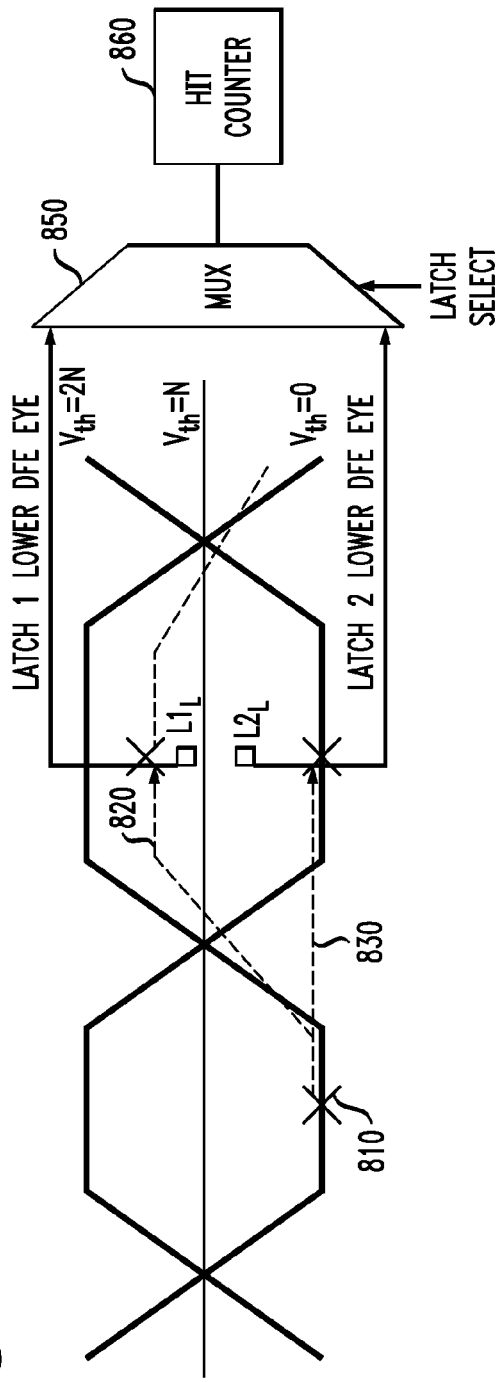

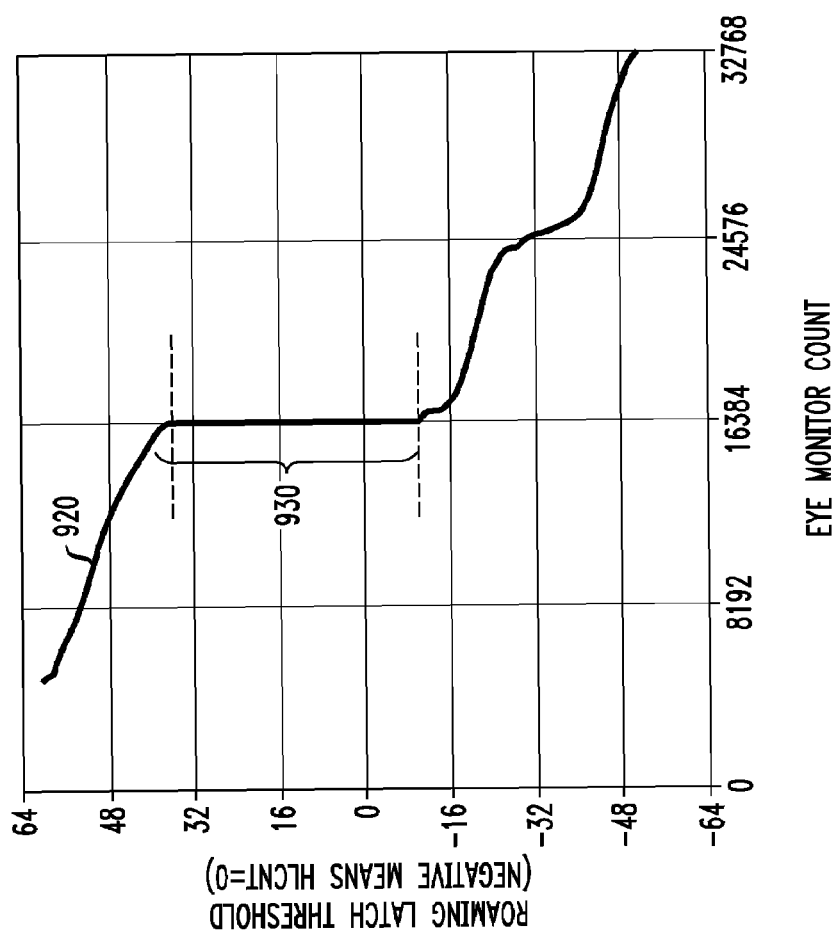
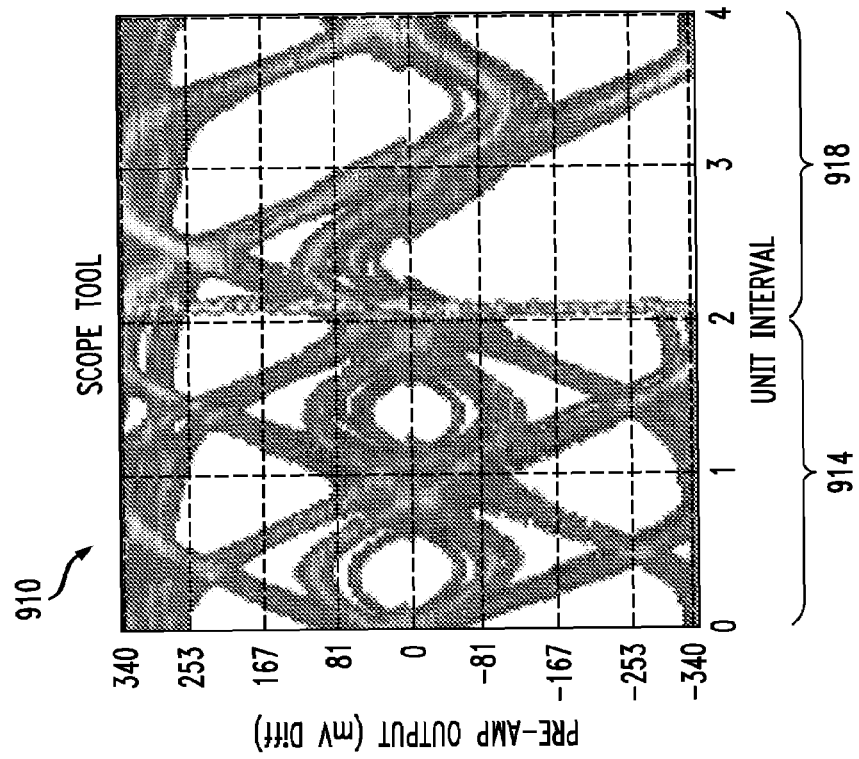
FIG. 9

| NON-LINEAR MAPPING TABLE – 1500 ||||
| MEASURED DATA (NO CORRECTION) | TRANSFORMED DATA (26 Km) | TRANSFORMED DATA (52 Km) | TRANSFORMED DATA (78 Km) |
| --- | --- | --- | --- |
| 0 | −1 | | |
| 1 | −.5 | ... | |
| 2 | 0 | | |
| ... | | ... | | ns
METHOD AND APPARATUS FOR NON-LINEAR DECISION-FEEDBACK EQUALIZATION IN THE PRESENCE OF ASYMMETRIC CHANNEL

CROSS-REFERENCE TO RELATED APPLICATIONS

The present application is related to U.S. patent application Ser. No. 11/414,522, filed Apr. 28, 2006, entitled "Method and Apparatus for Determining a Position of a Latch Employed for Decision-Feedback Equalization," and U.S. patent application Ser. No. 11/540,946, entitled "Method and Apparatus for Determining Latch Position for Decision-Feedback Equalization Using Single-Sided Eye," filed contemporaneously herewith, each incorporated by reference herein.

FIELD OF THE INVENTION

The present invention relates generally to decision-feedback equalization techniques, and more particularly, to techniques for determining the position of one or more latches employed for decision-feedback equalization in the presence of an asymmetric channel.

BACKGROUND OF THE INVENTION

Digital communication receivers must sample an analog waveform and then reliably detect the sampled data. Signals arriving at a receiver are typically corrupted by intersymbol interference (ISI), crosstalk, echo, and other noise. In order to compensate for such channel distortions, communication receivers often employ well-known equalization techniques. For example, zero equalization or decision-feedback equalization (DFE) techniques (or both) are often employed. Such equalization techniques are widely-used for removing intersymbol interference and to improve the noise margin. See, for example, R. Gitlin et al., Digital Communication Principles, (Plenum Press, 1992) and E. A. Lee and D. G. Messerschmitt, Digital Communications, (Kluwer Academic Press, 1988), each incorporated by reference herein. Generally, zero equalization techniques equalize the pre-cursors of the channel impulse response and decision-feedback equalization equalizes the post cursors of the channel impulse response.

In one typical DFE implementation, a received signal is sampled and compared to one or more thresholds to generate the detected data. A DFE correction is applied in a feedback fashion to produce a DFE corrected signal. The addition/subtraction, however, is considered to be a computationally expensive operation. Thus, a variation of the classical DFE technique, often referred to as Spatial DFE, eliminates the analog adder operation by sampling the received signal using two (or more) vertical slicers that are offset from the common mode voltage. The two slicers are positioned based on the results of a well-known Least Mean Square (LMS) algorithm. One slicer is used for transitions from a binary value of 0 and the second slicer is used for transitions from a binary value of 1. The value of the previous detected bit is used to determine which slicer to use for detection of the current bit. For a more detailed discussion of Spatial DFE techniques, see, for example, Yang and Wu, "High-Performance Adaptive Decision Feedback Equalizer Based on Predictive Parallel Branch Slicer Scheme," IEEE Signal Processing Systems 2002, 121-26 (2002), incorporated by reference herein. The offset position of the vertical slicers has been determined by evaluating an error term for a known receive data stream and adjusting the offset position using the well-known Least Mean Square algorithm. Such techniques, however, have been found to be unstable in a fixed point highly quantized signal environment and require excessive time to converge.

A communication channel typically exhibits a low pass effect on a transmitted signal. Conventional channel compensation techniques attempt to open the received data eye that has been band limited by the low pass channel response. Thus, the various frequency content of the signal will suffer different attenuation at the output of the channel. Generally, the higher frequency components of a transmitted signal are impaired more than the lower frequency components.

In addition, a number of channels, such as optical channels, exhibit a non-linear response. In optical communication, for example, data transmission is achieved by turning on and off one or more LED sources. When the light source is on (for example, when transmitting a binary value of 1), energy transmission takes place and the photons are transmitted through an optical fiber. As the light signal travels through the fiber, the signal experiences non-linear distortion due to, for example, chromatic dispersion, polarization mode dispersion (PMD) and modal dispersion in multi-mode fibers. In addition, regenerative noise sources distort the transmitted photon energy. These distortion sources are active along the entire length of the transmission medium. Thus, the signal degradation increases as the transmission distance increases. When the light source is off (for example, when transmitting a binary value of 0), on the other hand, no photons are transmitted and the above mentioned distortion does not take place at all. The optical eye thus degrades asymmetrically.

A need exists for improved methods and apparatus for determining the position of one or more latches employed for decision-feedback equalization in the presence of a non-linear channel. A further need exists for methods and apparatus for position one or more DFE latches in the presence of a non-linear channel based on an evaluation of the incoming data eye.

SUMMARY OF THE INVENTION

Generally, methods and apparatus are provided for determining the threshold position of one or more latches employed for decision-feedback equalization in the presence of a non-linear channel. According to one aspect of the invention, a threshold position of a latch employed by a decision-feedback equalizer is determined by constraining input data such that the input data only contains transitions from a first binary value; obtaining a plurality of samples of a single-sided data eye associated with the constrained input data; determining a threshold position of the latch based on the samples; and transforming the determined threshold position to address the non-linearity of the channel. The constrained input data can comprise (i) transitions from a binary value of 1 to a binary value of 0 or 1; or (ii) transitions from a binary value of 0 to a binary value of 0 or 1. The non-linearity may be addressed, for example, using a table or equation that maps measured threshold values to transformed threshold values based on distance. In this manner, the latches for the upper and lower single-sided eyes are positioned inside the single-sided data eye, and may both be below the zero axis.

The size of the single-sided data eye can be obtained by analyzing a histogram associated with the single-sided data eye to identify a region having a constant hit count. The latch is placed approximately in the middle of the single-sided eye. In one variation that provides improved immunity to data pattern sensitivity, the latch threshold position is determined for a plurality of single-sided eyes, such as N consecutive upper and lower single-sided eyes, and a latch threshold position is selected based on the single-sided eye having the smallest eye amplitude.

A more complete understanding of the present invention, as well as further features and advantages of the present invention, will be obtained by reference to the following detailed description and drawings.

BRIEF DESCRIPTION OF THE DRAWINGS

FIG. 3 is a block diagram of a transmitter, channel and receiver system that employs equalization techniques;

FIG. 4 is a block diagram of a transmitter, channel and receiver system that employs Spatial DFE;

FIG. 7 illustrates the sampling of a signal using a data eye monitor for a transition from a binary value of 1 to a binary value of 0 or 1;

FIG. 8 illustrates the sampling of a signal using a data eye monitor for a transition from a binary value of 0 to a binary value of 0 or 1;

FIG. 9 illustrates a histogram indicating an eye opening for a single sided eye in accordance with the present invention;

DETAILED DESCRIPTION

Figure 1:
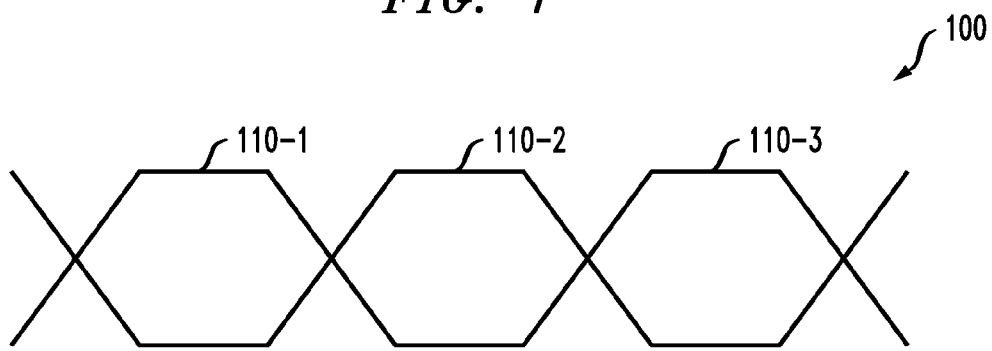
FIG. 1 graphically illustrates a number of ideal data eyes associated with a signal.

The present invention provides methods and apparatus for determining the position of DFE latches in the presence of a non-linear channel. The non-linearly mapped DFE coefficients generated by the present invention can be used with a classical threshold based DFE structure, as discussed below.

According to one aspect of the invention, the position for the vertical latches of a DFE is determined based on an evaluation of the incoming data eye. The exemplary data eye monitor may be implemented, for example, using the techniques described in U.S. patent application Ser. No. 11/095,178, filed Mar. 31, 2005, entitled "Method and Apparatus for Monitoring a Data Eye in a Clock and Data Recovery System," incorporated by reference herein. Generally, one or more latches associated with the exemplary data eye monitor employ an envelope detection technique to evaluate the amplitude of the signal. For a discussion of suitable envelope detection techniques, see, for example, U.S. patent application Ser. No. 11/318,953, filed Dec. 23, 2005, entitled "Method and Apparatus for Adjusting Receiver Gain Based on Received Signal Envelope Detection," incorporated by reference herein.

As previously indicated, a communication channel typically exhibits a low pass effect on a transmitted signal, causing the opening size of the received data eye to be significantly impaired, with the received data eye often being essentially closed. Conventional channel compensation techniques attempt to open the received data eye that has been band limited by the low pass channel response. A classical DFE implementation places a latch in the middle of the received data eye, which often has a small opening with poor noise and timing margins.

The present invention positions the vertical slicers using a single sided eye. As used herein, a single-sided eye (also referred to as a DFE eye) contains only transitions from one binary value (i.e., only 1→x or 0→x transitions). The small data eye is the result of the channel distortions that tend to close the data eye. The present invention recognizes that a larger DFE eye can be extracted by constraining the data to only contain signal transitions from, for example, a binary value 1 to a binary value of 0 or 1 (referred to as 1→x), and inhibiting any signal transitions from a binary value of 0.

As discussed further below in conjunction with FIG. 6, when the data is constrained to only have 1→x transitions, a significant amount of distortion that would normally be associated with the 0→x transitions is removed and the resulting upper DFE eye is larger than the small data eye associated with a classical approach. Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise margin is improved.

FIG. 1 graphically illustrates a number of ideal data eyes 110-1 through 110-3 associated with a signal 100. Although the ideal data eyes 110 shown in FIG. 1 do not exhibit any intersymbol interference for ease of illustration, each data eye 110 is typically a superposition of a number of individual signals with varying frequency components, in a known manner.

U.S. patent application Ser. No. 11/414,522, filed Apr. 28, 2006, entitled "Method And Apparatus For Determining A Position Of A latch Employed For Decision-Feedback Equalization," discloses a technique for determining the amplitude of the received signal 110 based on the relative measurements of fixed and roaming latches. The two latches are used to determine the upper and lower boundaries of the data eye, for transitions from binary 1 and for transitions from binary 0. The latches are then positioned between the detected upper and lower boundaries of the data eye for steady state operation. For example, the latches can be positioned in the middle of the respective upper and lower boundaries of the data eye. The data eye monitor can separately measure the received signal 110 along the vertical axis to determine the location of the upper and lower boundaries of the data eye, for both cases of transitions from binary values of 1 and 0. Thereafter, the mid-point between the upper and lower boundaries of the data eye can be established for both cases. The latches for both cases can be positioned for steady state operation based on the determined mid-point locations.

Figure 2A:
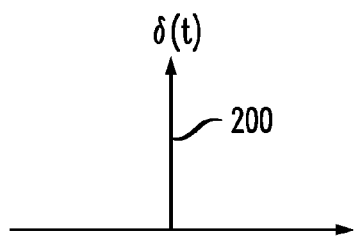
FIGS. 2A through 2D illustrate the distortion that can arise from a channel.
Figure 2B:
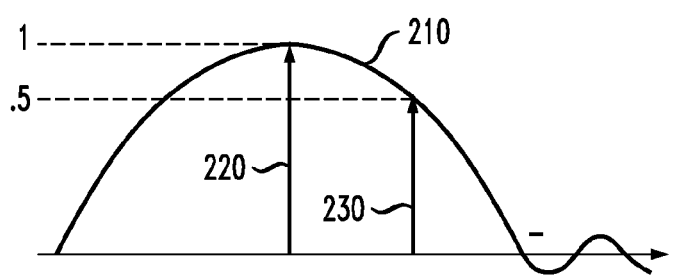

FIGS. 2A through 2D further illustrate the distortion that can arise from a channel. As shown in FIG. 2A, an ideal channel exhibits a delta function 200 as its impulse response. FIG. 2B illustrates an exemplary impulse response 210 for a hypothetical channel. As shown in FIG. 2B, in the time domain, the hypothetical channel may exhibit a response having a magnitude of 1.0 at the primary tap 220. In addition, at a first post cursor tap 230 the hypothetical channel may exhibit a response having a magnitude of 0.5. Thus, for this example, in the time domain, 50% of the signal will spillover and affect the next time interval.

Figure 2C:
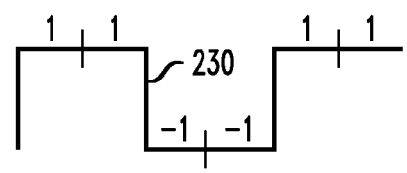
Figure 2D:
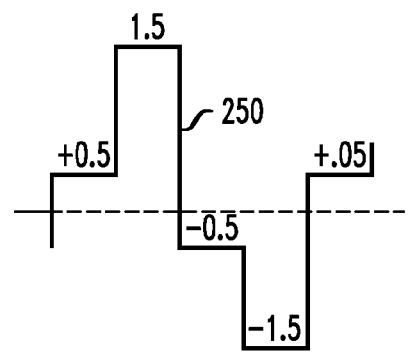

FIG. 2C illustrates an ideal clock signal 230 that may be transmitted across a channel. FIG. 2D illustrates the clock signal 250 that is received over the same channel as the result of channel distortion (after a sample/hold is applied). As shown in FIG. 2C, in each subsequent time slot, values of +1, +1, −1, −1, +1, +1, −1, −1, are transmitted to generate the clock signal 230. Assuming a channel having the exemplary impulse response 210 of FIG. 2B, and no channel compensation, the receiver will sample the signal 250 shown in FIG. 2D. The +1 that is transmitted in the second time slot will be superimposed with 50% of the +1 that was transmitted in the first time slot. Thus, a value of +1.5 will be measured at the receiver in the second time slot. Generally, one or more of pre-emphasis techniques in the transmitter or equalization techniques in the receiver (or both) are employed in a well-known manner so that the signal processed by the receiver looks like the clock signal 230 that was transmitted.

FIG. 3 is a block diagram of a transmitter, channel and receiver system 300 that employs equalization techniques. As shown in FIG. 3, the data is transmitted by a transmitter 310 through a channel 320 after optionally being equalized or filtered through a transmit FIR filter (TXFIR) (not shown). After passing though the channel 320, where noise is introduced, as represented by adder 330, the signal may optionally be filtered or equalized by a continuous time feed forward filter 340. Generally, the feed forward filter 340 performs pre-cursor equalization to compensate for the spillover from future transmitted symbols, in a known manner. The analog signal out of the feed forward filter 340 is sampled by a data detector 360 that generates data decisions. A DFE correction generated by a DFE filter 370 is applied to an analog summer 350 from the output, $U_k$, of the feed forward filter 340 to produce a DFE corrected signal, $B_k$.

FIG. 4 is a block diagram of a transmitter, channel and receiver system 400 that employs Spatial DFE. As indicated above, Spatial DFE is a variation of the classical DFE technique shown in FIG. 3 that eliminates the analog adder by sampling the received signal using two vertical slicers that are offset from the common mode voltage.

As shown in FIG. 4, pre-emphasis techniques 410 are applied in the transmitter before the signal is transmitted over a channel 420. In addition, equalization techniques 430, such as zero equalization, and spatial DFE 440 are applied in the receiver. According to one aspect of the invention, a latch positioning system 445, discussed below in conjunction with, for example, FIGS. 7 through 10, implements a vertical eye search algorithm 1000 (FIG. 10), to determine the position (i.e., threshold values) of the latches employed by the spatial DFE 440. When pre-emphasis techniques 410 are applied in the transmitter, the output of the latch positioning system 900 is fed back to the transmitter using an in-band or out of band protocol 450.

Figure 5:
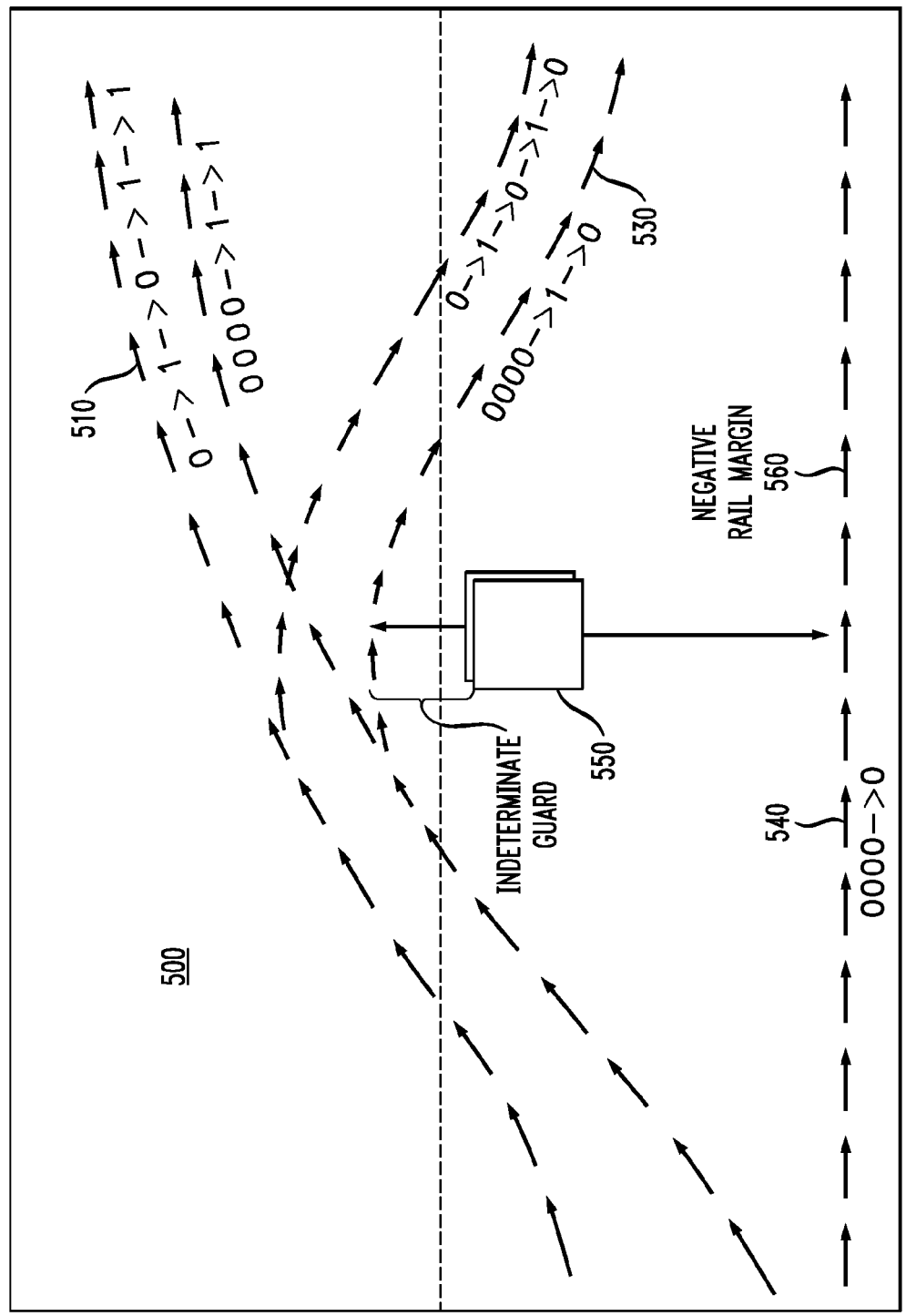
FIG. 5 illustrates an exemplary transition trajectory from an exemplary binary value of 0 to a binary value of 0 or 1.

As previously indicated, each data eye 110 is a superposition of a number of individual eye traces. The signal associated with different data transitions will have a different frequency. FIG. 5 illustrates an exemplary transition trajectory for an exemplary transition from a binary value of 0 to a binary value of 0 or 1 (0→x). A trajectory 510, for example, is associated with a transition from a binary value of 0 to a 1 (and then followed by another 1). A trajectory 530, for example, is associated with a transition from a binary value of 0 having prior states 000 to a binary value of 1 (followed by a 0). A trajectory 540 is associated with a transition from a binary value of 0 having prior states 000 to a binary value of 0.

As shown in FIG. 5, the different trajectories are all associated with a prior state of 0. Each trajectory, however, follows a different path. In accordance with the Spatial DFE technique 440, a single latch 550 must be able to detect whether the current data bit is a 0 or a 1, despite the varying paths. Generally, the latch 550 is positioned between the negative rail margin 560 and the amplitude of the lowest expected trajectory 530. A data eye monitor can be used to determine a location for the latch 550 used for the spatial DFE 440.

As indicated above, a communication channel typically exhibits a low pass effect on a transmitted signal, causing the opening size of the received data eye to be significantly impaired, with the received data eye often being essentially closed. FIG. 6 illustrates the noise and timing margins for a received signal 600. As shown in FIG. 6, a received signal will typically include transitions 610 from a binary value 1 to a binary value of 0 or 1 (1→x), as well as transitions 620 from a binary value 0 to a binary value of 0 or 1 (0→x).

The present invention recognizes that a larger DFE eye can be extracted by constraining the data to only contain signal transitions from, for example, a binary value 1 to a binary value of 0 or 1 (referred to as 1→x), and inhibiting any signal transitions from a binary value of 0 (or vice versa).

Figure 6:
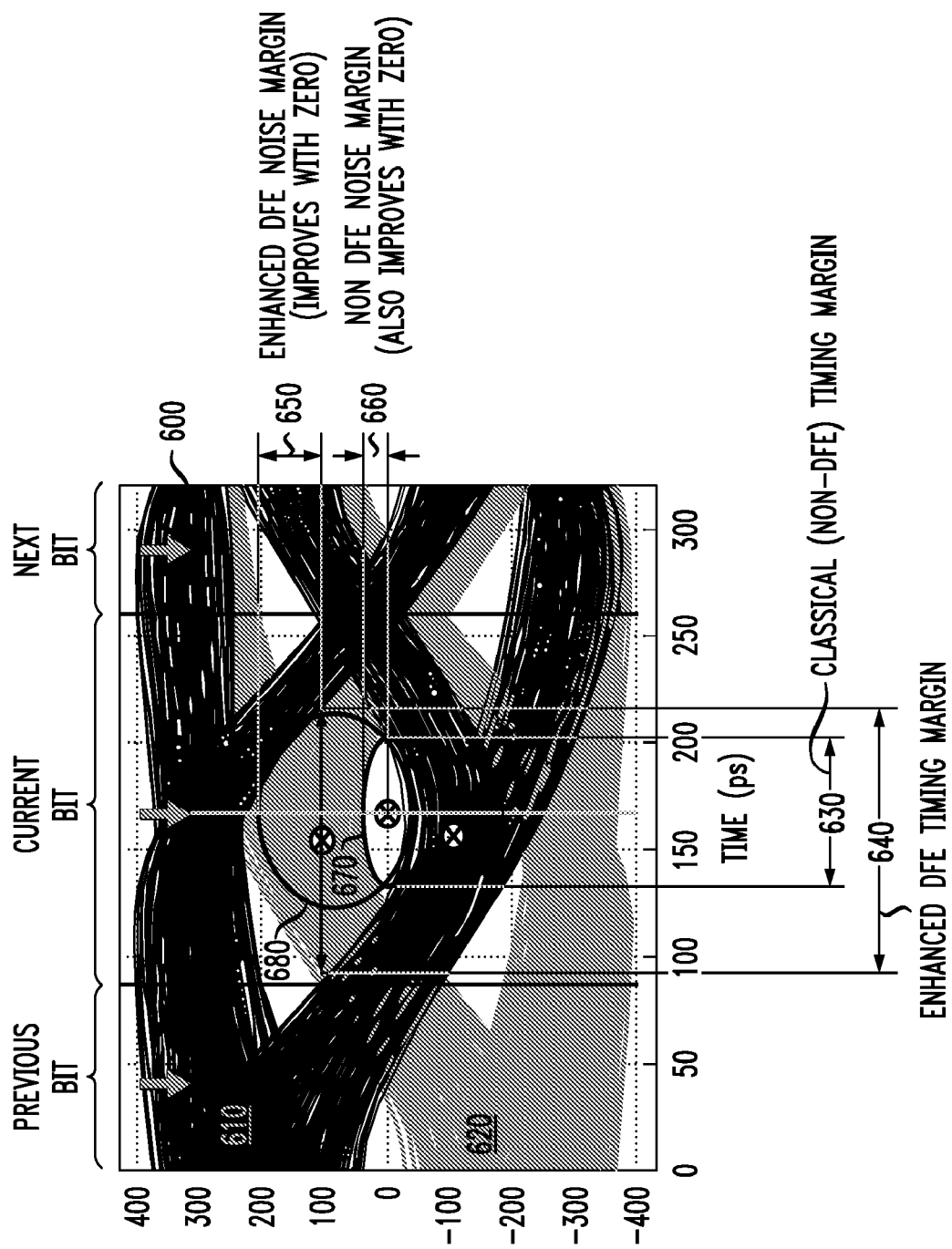
FIG. 6 illustrates the noise and timing margins for a received signal.

As shown in FIG. 6, when the full set of signal transitions is considered, the size of the classical data eye is approximately associated with the inner circle 670, having an associated timing margin 630 and noise margin 660. The small size of the data eye 770 with the corresponding poor margins 630, 660, makes it very difficult to properly recover the transmitted data. When the data is constrained to only have 1→x transitions, the distortion that would normally be associated with the 0→x transitions is removed and the resulting upper DFE eye, approximately associated with the outer circle 680, is larger than the small data eye 670 associated with a classical approach (and both sets of transitions). The upper DFE eye 680 has an associated timing margin 640 and noise margin 650. Thus, by inhibiting one set of binary transitions 610, 620, the size of the data eye 680 is significantly increased, and the timing and noise margins 640, 650 are improved.

Likewise, when the data is constrained to only have 0→x transitions, a significant amount of distortion that would normally be associated with the 1→x transitions is removed and the resulting lower DFE eye is larger than the small data eye associated with a classical approach. In this manner, by inhibiting one set of binary transitions, the size of the data eye is significantly increased, and the noise and timing margins are improved.

FIG. 7 illustrates the sampling of a signal using a data eye monitor for a transition 730 from an initial state 710 of binary value 1 to a binary value of 0 or a transition 720 from a binary value of 1 to a binary value of 1. For ease of illustration, only the trajectory 730 associated with the Nyquist frequency and the trajectory 720 associated with the maximum amplitude of the remaining frequencies are shown. As shown in FIG. 7, two upper latches $L1_U$ and $L2_U$ are employed in the exemplary embodiment to determine the amplitudes of the trajectories 720, 730 for the upper DFE data eye and thereby determine a location for the latch(es) used for the spatial DFE 440.

As discussed further below in conjunction with FIG. 10, the first upper latch $L1_U$ samples the received signal from the point of zero crossing ($V_{th}$=N) in the positive direction to the maximum value ($V_{th}$=2N). Likewise, the second upper latch $L2_U$ samples the received signal from the point of zero crossing ($V_{th}$=N) in the negative direction to the minimum value ($V_{th}$=0). The sampled values (Latch 1 Upper DFE Eye and Latch 2 Upper DFE Eye) are applied to a multiplexer 750 that selects one of the latches, based on the portion of the data eye that is being sampled in accordance with a latch selection control signal. The output of the multiplexer 750 is applied to a hit counter 760, discussed further below in conjunction with FIG. 9.

FIG. 8 illustrates the sampling of a signal using a data eye monitor in accordance with the present invention for a transition 830 from an initial state 810 of binary value 0 to a binary value of 0 or a transition 820 from a binary value of 0 to a binary value of 1 and then a binary value of 0. For ease of illustration, only the trajectory 820 associated with the Nyquist frequency and the trajectory 830 associated with the minimum amplitude of the remaining frequencies are shown. As shown in FIG. 7, two lower latches $L1_L$ and $L2_L$ are employed in the exemplary embodiment to determine the amplitudes of the trajectories 820, 830 for the lower DFE data eye and thereby determine a location for the latch(es) used for the spatial DFE 440.

As discussed further below in conjunction with FIG. 10, the first lower latch $L1_L$ samples the received signal from the point of zero crossing ($V_{th}$=N) in the positive direction to the maximum value ($V_{th}$=2N). Likewise, the second lower latch $L2_L$ samples the received signal from the point of zero crossing ($V_{th}$=N) in the negative direction to the minimum value ($V_{th}$=0). The sampled values (Latch 1 Lower DFE Eye and Latch 2 Lower DFE Eye) are applied to a multiplexer 850 that selects one of the latches, based on the portion of the data eye that is being sampled in accordance with a latch selection control signal. The output of the multiplexer 850 is applied to a hit counter 860, discussed further below in conjunction with FIG. 9.

FIG. 9 illustrates a histogram 920 generated by the hit counters 760, 860 of FIGS. 7 and 8, indicating an eye opening for a single sided eye in accordance with the present invention. As shown in FIG. 9, a scope output 910 illustrates the preamplifier output as a function of the unit interval for four consecutive data eyes. For the first two data eyes 914, the output is shown for all transitions. For the second two eyes 918, only transitions from a binary value of 1 to a binary value of 0 or 1 (1→x) are shown, in accordance with the present invention.

The histogram 920 shows the threshold of the roaming latches $L1_U$, $L2_U$, $L1_L$ and $L2_L$, as a function of the eye monitor counts generated by the hit counters 760, 860. As shown in FIG. 9, the minimum count occurs when the threshold is at a maximum value (since the entire signal is below the latch) and a maximum count occurs when the threshold is at a minimum value (since the entire signal is above the latch). The histogram 920 also contains a region 930 having a constant count, corresponding to the DFE eye opening. The vertical eye search algorithm 1000 (FIG. 10) determines when the histogram 920 is constant, to obtain the range of threshold values when the eye is open.

Figure 10:
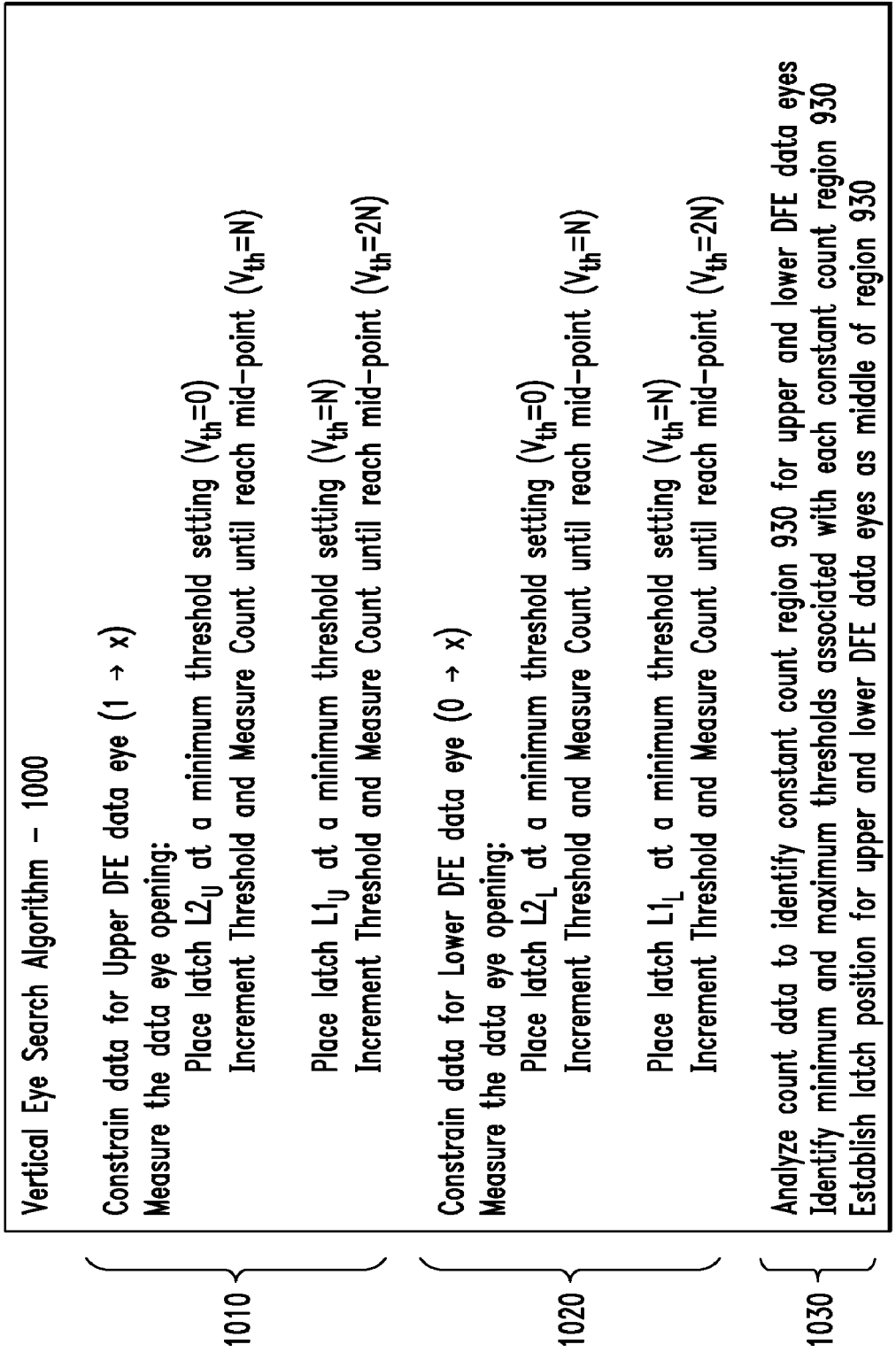
FIG. 10 provides exemplary pseudo code for an illustrative vertical eye search algorithm incorporating features of the present invention.

FIG. 10 provides exemplary pseudo code for an illustrative vertical eye search algorithm 1000 incorporating features of the present invention. The illustrative vertical eye search algorithm 1000 is employed during a training mode to determine the position of the latches that used by the Spatial DFE 440 in the normal operating (steady state) mode. As shown in FIG. 10, the exemplary vertical eye search algorithm 1000 contains a first measurement section 1010 for measuring the upper DFE data eye, a second measurement section 1020 for measuring the upper DFE data eye, and an analysis section 1030 for analyzing the count data to establish the latch positions for the upper and lower DFE data eyes. In particular, the latches are positioned in the middle of the constant count region 930 for each of the upper and lower DFE data eyes.

Figure 11:
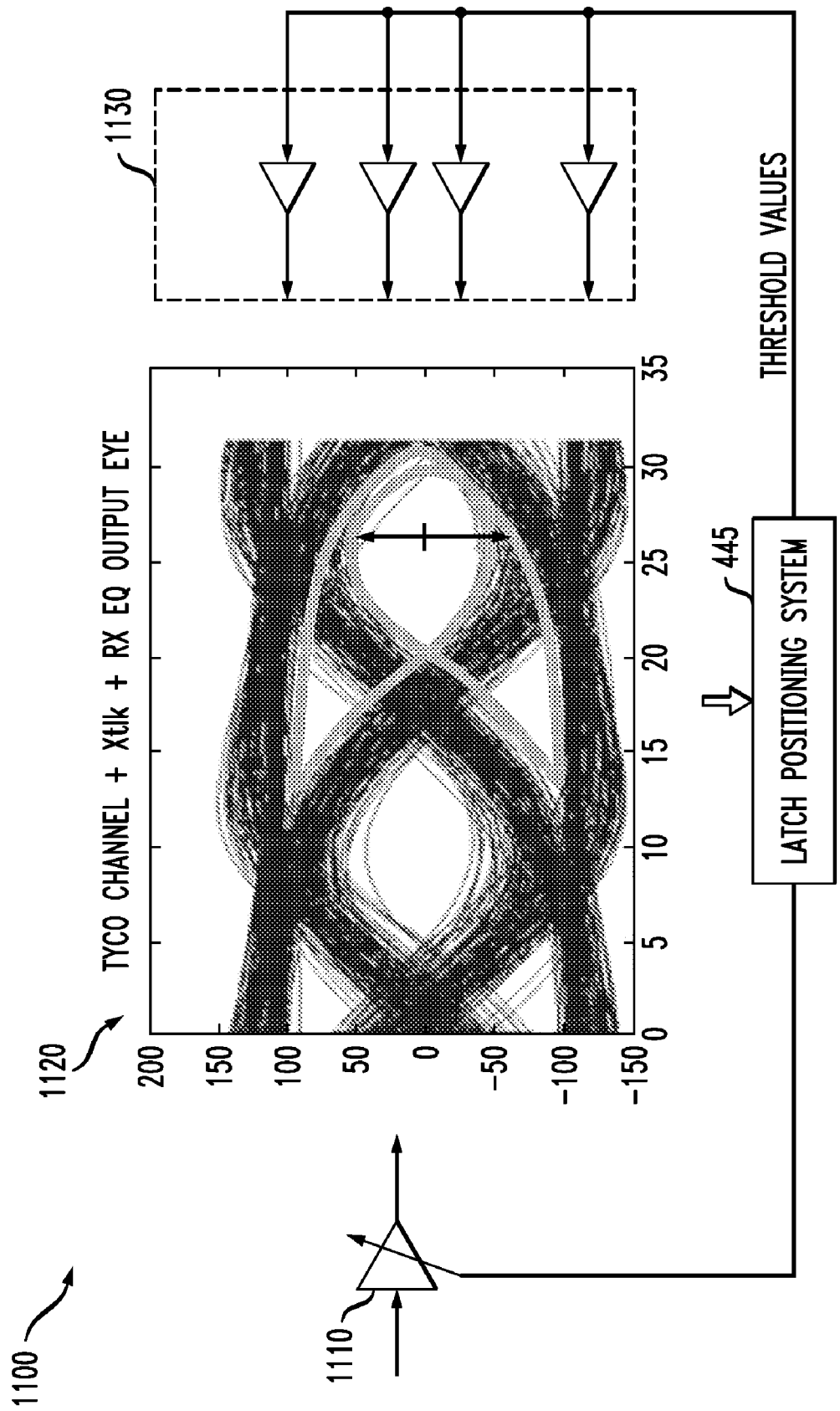
FIG. 11 illustrates the manner in which the latch positions determined by the vertical eye search algorithm of FIG. 10 are used by the spatial DFE of FIG. 4.

FIG. 11 illustrates the manner in which the latch positions determined by the vertical eye search algorithm 1000 of FIG. 10 are used by the spatial DFE 440 of FIG. 4. As shown in FIG. 11, the received signal is amplified by a preamplifier 1110 and then analyzed on a scope 1120. The latch positioning system 445 of FIG. 4 analyzes the received data eyes during a training mode using the single-sided eye techniques disclosed herein, in accordance with the vertical eye search algorithm 1000, to determine the latch positions (i.e., threshold values). The threshold values are applied to the latch array 1130 for steady state operation.

Figure 12:
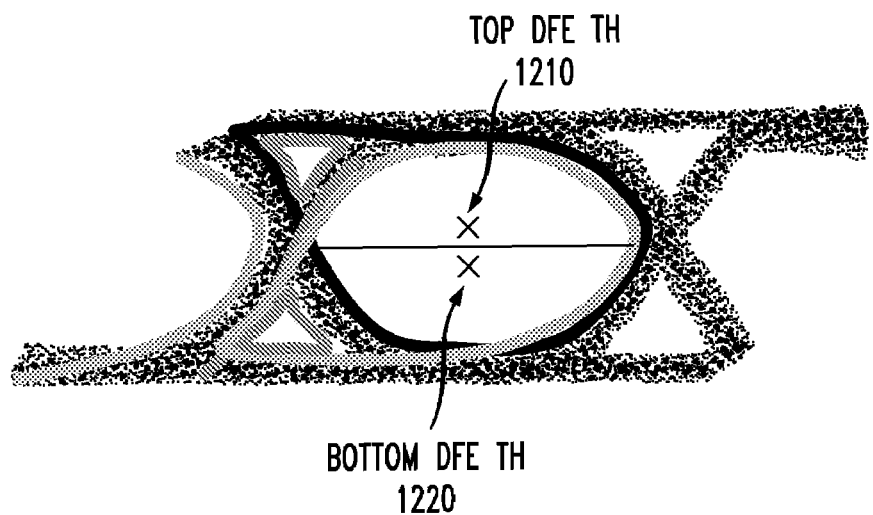
FIG. 12 illustrates the symmetric placement of DFE latches for the upper and lower DFE eyes.

FIG. 12 illustrates the symmetric placement of DFE latches 1210, 1220 for the upper and lower DFE eyes, respectively. As shown in FIG. 12, the upper and lower DFE latches 1210, 1220 are placed symmetrically about the zero crossing. In other words, the upper and lower DFE latches 1210, 1220 are equally spaced from a threshold of 0. In fact, in a symmetric system, the latch positioning system 445 could determine a latch position for one of the upper and lower DFE data eyes, and position the second latch to ensure symmetry about the zero crossing.

The shape of a data eye is a function of the channel impairments, as well as the data pattern. Thus, certain data patterns can provide a false indication of an asymmetric data eye. A further variation of the present invention provides improved immunity to the data pattern sensitivity by considering one or more unit intervals, each corresponding to a data eye having upper and lower DFE data eyes, and positioning the latches based on the worst case (i.e., the smallest eye). Thus, the system is assumed to be symmetric and the smallest eye is used for setting the latches for both upper and lower DFE eyes.

Figure 13:
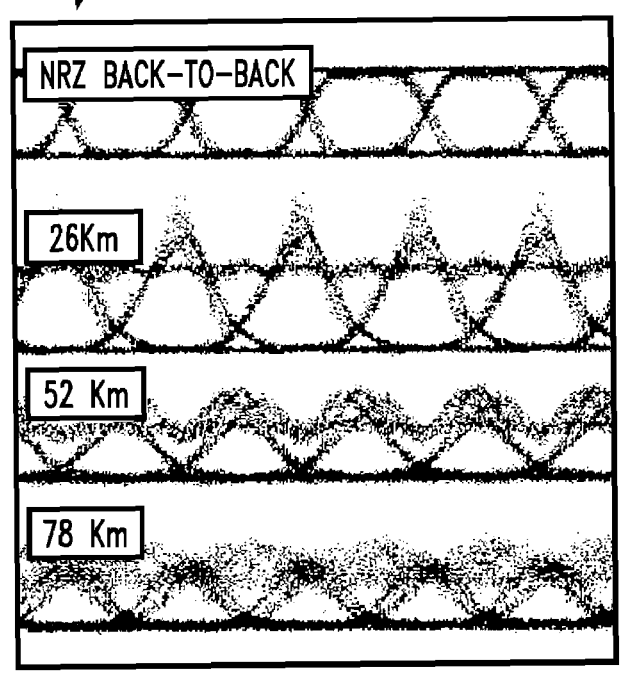
FIG. 13 illustrates the data eyes as the result of non-linear ISI distortion that may be present in some channels, such as an optical channel.

FIG. 13 illustrates the data eyes as the result of non-linear ISI distortion that may be present in some channels, such as an optical channel. As previously indicated, many channels, such as optical channels, exhibit a non-linear response. In optical communication, for example, data transmission is achieved by turning on and off one or more LED sources. When the light source is on (for example, when transmitting a binary value of 1), energy transmission takes place and the photons are transmitted through an optical fiber. As the light signal travels through the fiber, the signal experiences non-linear distortion due to, for example, chromatic dispersion, polarization mode dispersion (PMD) and modal dispersion in multi-mode fibers. In addition, regenerative noise sources distort the transmitted photon energy. These distortion sources are active along the entire length of the transmission medium. Thus, as shown in FIG. 13, the signal degradation increases as the transmission distance increases. The data eye becomes increasingly harder to distinguish as the distance increases (see, for example, 78 Km). As a result, the decision threshold for a binary value of one is continually pushed downwards as the distance increases, making the threshold go below zero as the transmission distance is increased.

When the light source is off (for example, when transmitting a binary value of 0), on the other hand, no photons are transmitted and the above mentioned distortion does not take place at all. The optical eye thus degrades asymmetrically. For a more detailed discussion of non-linear distortion in optical channels, see, for example, Hyuek Jae Lee and S. J. B. Yoo, "Novel All-Optical 10 Gbp/s RZ-to-NRZ Conversion Using SOA-Loop-Mirror," Optical Switching and Communications Systems Lab., Department of Electrical and Computer Engineering, UC Davis, 3114 Engineering II, Davis, Calif. 95616-5294.

Figures 14, 15:
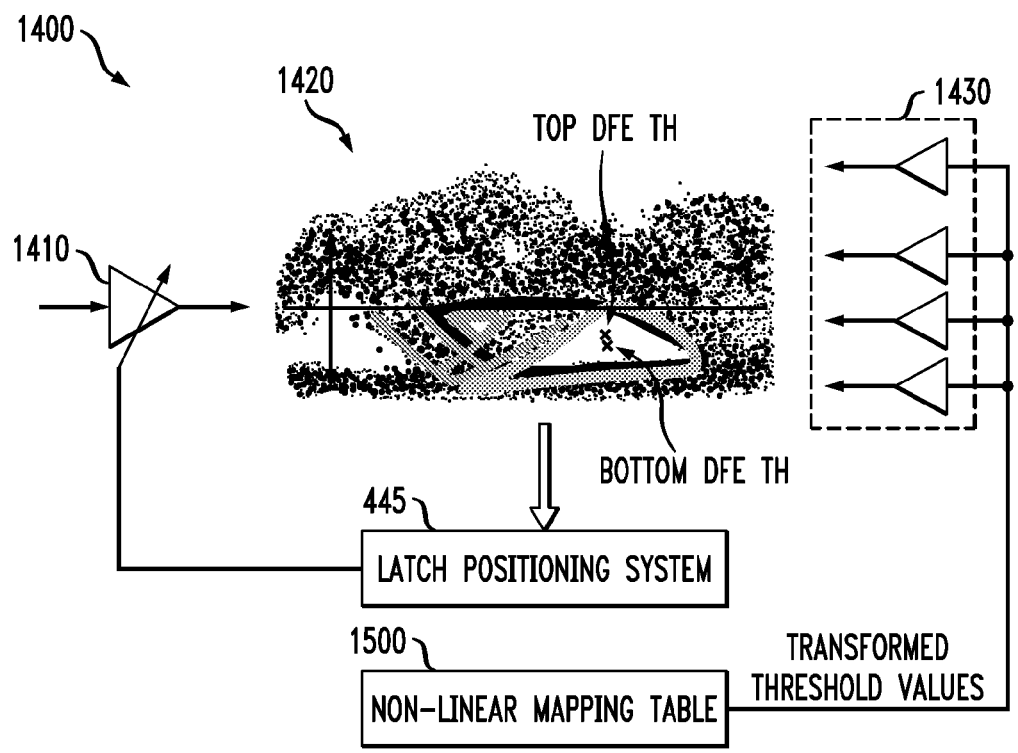
FIG. 14 illustrates the manner in which the latch positions determined by the vertical eye search algorithm of FIG. 10 are used by the spatial DFE of FIG. 4 in the presence of a non-linear channel.
FIG. 15 illustrates an exemplary non-linear mapping table of FIG. 14.

FIG. 14 illustrates the manner in which the latch positions determined by the vertical eye search algorithm 1000 of FIG. 10 are used by the spatial DFE 440 of FIG. 4 in the presence of a non-linear channel. The non-linearly mapped DFE coefficients generated by the present invention can be used with a classical threshold based DFE structure, as shown in FIG. 14.

As shown in FIG. 14, the received signal is amplified by a preamplifier 1410 and then analyzed on a scope 1420. The latch positioning system 445 of FIG. 4 analyzes the received data eyes during a training mode using the single-sided eye techniques disclosed herein, in accordance with the vertical eye search algorithm 1000, to determine the latch positions (i.e., threshold values). According to one aspect of the invention, the measured latch positions are transformed to address the non-linearity. The transformation can be based, for example, on experimentation or a calculation using the length of the optical fiber. In one exemplary implementation, a non-linear mapping table 1500 (FIG. 15) is employed to map the measured latch positions to a transformed threshold value that addresses the non-linearity. The transformed threshold values are applied to the latch array 1130 for steady state operation.

FIG. 15 illustrates an exemplary non-linear mapping table 1500. As shown in FIG. 15, the table 1500 contains a plurality of records, each associated with a different threshold. For each measured threshold, the table 1500 indicates a transformed threshold for various optical lengths, such as the distances shown in FIG. 13.

In further variations, an equation may be implemented to characterize the non-linear channel and map the measured threshold values to transformed threshold values. It is also noted that a channel model can be employed instead of actual measurements. In yet another variation, the single-sided eye can be observed, for example, on an oscilloscope and the single-sided eye can be skewed to address the non-linearity.

A plurality of identical die are typically formed in a repeated pattern on a surface of the wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

It is to be understood that the embodiments and variations shown and described herein are merely illustrative of the principles of this invention and that various modifications may be implemented by those skilled in the art without departing from the scope and spirit of the invention.

We claim:

1. A method for determining a threshold position of a latch employed by a decision-feedback equalizer for a non-linear channel, comprising:
constraining input data such that said input data only contains transitions from a first binary value;
obtaining a plurality of samples of a single-sided data eye associated with said constrained input data;
determining a threshold position of said latch based on said samples; and
transforming said determined threshold position to address said non-linearity of said channel.

2. The method of claim 1, wherein said transforming step employs a non-linear mapping table that maps measured threshold values to transformed threshold values based on distance.

3. The method of claim 1, wherein said transforming step employs a non-linear mapping table that maps measured threshold values to transformed threshold values based on distance using a channel model.

4. The method of claim 1, wherein said transforming step employs a non-linear equation that characterizes said non-linear channel to map measured threshold values to transformed threshold values based on distance.

5. The method of claim 1, wherein said transforming step skews said single-sided eye to address said non-linearity.

6. The method of claim 1, wherein said transforming step positions said latch inside said single-sided data eye.

7. The method of claim 1, wherein said latch is placed approximately in the middle of said single-sided data eye.

8. The method of claim 1, wherein said transforming step positions latches for upper and lower single-sided eyes below a zero axis.

9. The method of claim 1, wherein said constrained input data only contains transitions from a binary value of 1 to a binary value of 0 or 1.

10. The method of claim 1, wherein said constrained input data only contains transitions from a binary value of 0 to a binary value of 0 or 1.

11. A system for determining a threshold position of a latch employed by a decision-feedback equalizer for a non-linear channel, comprising:
a mask circuit for constraining input data such that said input data only contains transitions from a first binary value;
a plurality of latches for obtaining a plurality of samples of a single-sided data eye associated with said constrained input data;
a latch threshold positioning system for determining a threshold position of said latch based on said samples; and
a non-linear mapping circuit to transform said determined threshold position to address said non-linearity of said channel.

12. The system of claim 11, wherein said non-linear mapping circuit comprises a non-linear mapping table that maps measured threshold values to transformed threshold values based on distance.

13. The system of claim 11, wherein said non-linear mapping circuit comprises a non-linear mapping table that maps measured threshold values to transformed threshold values based on distance using a channel model.

14. The system of claim 11, wherein said non-linear mapping circuit implements a non-linear equation that characterizes said non-linear channel to map measured threshold values to transformed threshold values based on distance.

15. The system of claim 11, wherein said non-linear mapping circuit skews said single-sided eye to address said non-linearity.

16. The system of claim 11, wherein said non-linear mapping circuit comprises positions said latch inside said single-sided data eye.

17. The system of claim 11, wherein said latch is placed approximately in the middle of said single-sided data eye.

18. The system of claim 11, wherein said transforming step positions latches for upper and lower single-sided eyes below a zero axis.

19. The system of claim 11, wherein said constrained input data only contains transitions from a first binary value.

20. An integrated circuit, comprising:
a circuit for determining a threshold position of a latch employed by a decision-feedback equalizer for a non-linear channel, comprising:
a mask circuit for constraining input data such that said input data only contains transitions from a first binary value;
a plurality of latches for obtaining a plurality of samples of a single-sided data eye associated with said constrained input data;
a latch threshold positioning system for determining a threshold position of said latch based on said samples; and
a non-linear mapping circuit to transform said determined threshold position to address said non-linearity of said channel.

* * * * *